United States Patent
Chowdhury et al.

(10) Patent No.: US 11,906,658 B2
(45) Date of Patent: Feb. 20, 2024

(54) SYSTEMS AND METHODS FOR SHAPELET DECOMPOSITION BASED GESTURE RECOGNITION USING RADAR

(71) Applicant: Tata Consultancy Services Limited, Mumbai (IN)

(72) Inventors: Arijit Chowdhury, Kolkata (IN); Smriti Rani, Kolkata (IN); Tapas Chakravarty, Kolkata (IN); Arpan Pal, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 749 days.

(21) Appl. No.: 17/037,335

(22) Filed: Sep. 29, 2020

(65) Prior Publication Data
US 2021/0199761 A1 Jul. 1, 2021

(30) Foreign Application Priority Data
Dec. 18, 2019 (IN) .............................. 201921052641

(51) Int. Cl.
*G01S 7/41* (2006.01)
*G06N 20/00* (2019.01)
(Continued)

(52) U.S. Cl.
CPC ............. *G01S 7/415* (2013.01); *G06F 3/017* (2013.01); *G06N 5/04* (2013.01); *G06N 20/00* (2019.01)

(58) Field of Classification Search
CPC .......... G01S 7/415; G06N 20/00; G06N 5/04; G06F 3/017
(Continued)

(56) References Cited

U.S. PATENT DOCUMENTS

| 4 A | * | 8/1836 | Blanchard | 74/471 R |
| 6,363,160 B1 | * | 3/2002 | Bradski | G06F 18/00 382/103 |

(Continued)

FOREIGN PATENT DOCUMENTS

| CN | 104020845 A | 9/2014 |
| CN | 109614904 A | 4/2019 |

(Continued)

OTHER PUBLICATIONS

Batra, Dhruv Batra et al., "Space-Time Shapelets for Action Recognition", IEEE Workshop on Motion and video Computing, 2018, Semantic Scholar, https://www.cc.gatech.edu/~dbatra/papers/batra_wmvc_2008.pdf.

*Primary Examiner* — Nuzhat Pervin
(74) *Attorney, Agent, or Firm* — FINNEGAN, HENDERSON, FARABOW, GARRETT & DUNNER LLP

(57) ABSTRACT

This disclosure relates to systems and methods for shapelet decomposition based recognition using radar. State-of-the-art solutions involve use of standard machine learning classification techniques for gesture recognition which suffer with problem of dependency on collected data. The present disclosure overcome the limitations faced by the state-of-the-art solutions by obtaining a plurality of time domain signal using a radar system comprising three vertically arranged radars and one or more sensors, identifying one or more gesture windows to obtain one or more shapelets corresponding to one or gestures which are further decomposed into a plurality of sub shapelets. Further, at least one of (i) a positive or (i) a negative time delay is applied to each of the plurality of sub shapelets to obtain a plurality of composite shapelets which are further mapped (Continued)

with a plurality of trained shapelets to recognize gestures comprised in one or more activities performed by a subject.

12 Claims, 19 Drawing Sheets

(51) Int. Cl.
*G06F 3/01* (2006.01)
*G06N 5/04* (2023.01)

(58) Field of Classification Search
USPC .......................................................... 342/195
See application file for complete search history.

(56) References Cited

U.S. PATENT DOCUMENTS

| | | | | |
|---|---|---|---|---|
| 2008/0170776 | A1* | 7/2008 | Albertson | G06F 21/36 382/154 |
| 2011/0274311 | A1* | 11/2011 | Lee | G10L 13/00 381/74 |
| 2012/0176305 | A1* | 7/2012 | Ryu | G06V 40/20 345/156 |
| 2015/0036884 | A1* | 2/2015 | Ivanchenko | G06F 3/017 382/103 |
| 2015/0045700 | A1* | 2/2015 | Cavanagh | G16H 40/67 600/595 |
| 2016/0147294 | A1* | 5/2016 | Bae | G06F 3/017 345/156 |
| 2016/0192866 | A1* | 7/2016 | Norstrom | A63B 24/0006 434/247 |
| 2017/0161607 | A1* | 6/2017 | English | G06V 40/28 |
| 2018/0120420 | A1* | 5/2018 | McMahon | A61B 5/7267 |
| 2019/0101992 | A1* | 4/2019 | Harrison | G06F 3/0484 |
| 2020/0117788 | A1* | 4/2020 | Mohammad | G06F 18/00 |
| 2021/0191518 | A1* | 6/2021 | Babu | G07C 5/085 |
| 2022/0124154 | A1* | 4/2022 | Zou | H04L 67/12 |

FOREIGN PATENT DOCUMENTS

| | | | | |
|---|---|---|---|---|
| EP | 2474881 A2 * | 7/2012 | | G06F 3/005 |
| EP | 2624171 A2 * | 8/2013 | | A63B 69/182 |
| WO | WO-2015181685 A1 * | 12/2015 | | G06F 3/005 |
| WO | WO-2017185068 A1 * | 10/2017 | | G06F 3/03 |
| WO | WO-2019006473 A1 * | 1/2019 | | G01S 15/58 |

* cited by examiner

Basis Gesture 1    Basis Gesture 2    Basis Gesture 3

Basis Gesture 1   Basis Gesture 2   Basis Gesture 3

Basis Gesture 1  Basis Gesture 2  Basis Gesture 3

US 11,906,658 B2

SYSTEMS AND METHODS FOR SHAPELET DECOMPOSITION BASED GESTURE RECOGNITION USING RADAR

PRIORITY CLAIM

This U.S. patent application claims priority under 35 U.S.C. § 119 to: India Application No. 201921052641, filed on Dec. 18, 2019. The entire contents of the aforementioned application are incorporated herein by reference.

TECHNICAL FIELD

The disclosure herein generally relates to gesture recognition, and, more particularly, to systems and methods for shapelet decomposition based gesture recognition using radar.

BACKGROUND

Gesture recognition is emerging as an attractive feature in multiple areas such as health monitoring and the like. For example, in many countries, proportion of elderly population has been rapidly increasing and will continue to grow significantly in future. Thus, it is necessary to monitor health of the elderly population to ensure their medical needs are met and they are living comfortable life. Elderly care requires privacy preserving detection of gestures performed by the elderly population. Then, based on the detected gestures, different activities performed by elders such as fall detection, triggering alarm for sending help are detected. Radar based techniques and/or devices have been used to perform gesture recognition which give good performance while preserving privacy, can work in low or no light conditions, can work through walls and are unobtrusive.

Conventional systems and methods using radar for gesture recognition involve highly complex radar system such as ultra wide band (UWB) radars, frequency modulated continuous wave (FMCW) radars, and the like. Other conventional systems and methods for gesture recognition rely on machine learning and deep learning techniques for feature extraction from time domain signals which fail to effectively distinguish different gestures.

SUMMARY

Embodiments of the present disclosure present technological improvements as solutions to one or more of the above-mentioned technical problems recognized by the inventors in conventional systems.

In an aspect, there is provided a processor implemented method, the method comprising the steps of: obtaining, using a radar system, a plurality of time domain signals reflected by a subject performing one or more activities; identifying, one or more gesture windows in the plurality of obtained time domain signals, by applying one or more signal properties on the plurality of obtained time domain signals to detect a no motion region and a motion region in the plurality of obtained time domain signals, wherein width of each gesture window is indicative of a time duration in which a gesture is performed; obtaining, using a spectrogram, one or more shapelets of one or more gestures captured from the one or more gesture windows; creating a dictionary of basic shapelets of one or more motion patterns of a plurality of gestures comprised in the one or more activities performed by the subject; decomposing, using the created dictionary of basic shapelets, the one or more shapelets to obtain a plurality of sub-shapelets of the one or more gestures captured from the one or more gesture windows, wherein each sub-shapelet is representative of a specific motion pattern of each of the one or more gestures captured from the one or more gesture windows; applying, at least one of (i) a positive or (ii) negative time delay to each of the plurality of sub-shapelets of the one or more gestures to obtain a plurality of composite shapelets for the one or more gestures; and performing, a mapping of each of the plurality of composite shapelets with a plurality of trained shapelets stored in a system database to recognize the plurality of gestures comprised in the one or more activities being performed by the subject.

In another aspect, there is provided a system, the system comprising: one or more data storage devices operatively coupled to one or more hardware processors and configured to store instructions configured for execution via the one or more hardware processors to: obtain, using a radar system, a plurality of time domain signals reflected by a subject performing one or more activities; identify, one or more gesture windows in the plurality of obtained time domain signals, by applying one or more signal properties on the plurality of obtained time domain signals to detect a no motion region and a motion region in the plurality of obtained time domain signals, wherein width of each gesture window is indicative of a time duration in which a gesture is performed; obtain, using a spectrogram, one or more shapelets of one or more gestures captured from the one or more gesture windows; create a dictionary of basic shapelets of one or more motion patterns of a plurality of gestures comprised in the one or more activities performed by the subject; decompose, using the created dictionary of basic shapelets, the one or more shapelets to obtain a plurality of sub-shapelets of the one or more gestures captured from the one or more gesture windows, wherein each sub-shapelet is representative of a specific motion pattern of each of the one or more gestures captured from the one or more gesture windows; apply, at least one of (i) a positive or (ii) negative time delay to each of the plurality of sub-shapelets of the one or more gestures to obtain a plurality of composite shapelets for the one or more gestures; and perform, a mapping of each of the plurality of composite shapelets with a plurality of trained shapelets stored in a system database to recognize the plurality of gestures comprised in the one or more activities being performed by the subject.

In yet another aspect, there is provided a computer program product comprising a non-transitory computer readable medium having a computer readable program embodied therein, wherein the computer readable program, when executed on a computing device, causes the computing device to: obtain, using a radar system, a plurality of time domain signals reflected by a subject performing one or more activities; identify, one or more gesture windows in the plurality of obtained time domain signals, by applying one or more signal properties on the plurality of obtained time domain signals to detect a no motion region and a motion region in the plurality of obtained time domain signals, wherein width of each gesture window is indicative of a time duration in which a gesture is performed; obtain, using a spectrogram, one or more shapelets of one or more gestures captured from the one or more gesture windows; create a dictionary of basic shapelets of one or more motion patterns of a plurality of gestures comprised in the one or more activities performed by the subject; decompose, using the created dictionary of basic shapelets, the one or more shapelets to obtain a plurality of sub-shapelets of the one or more gestures captured from the one or more gesture windows, wherein each sub-shapelet is representative of a specific motion pattern of each of the one or more gestures captured from the one or more gesture windows; apply, at least one of (i) a positive or (ii) negative time delay to each of the plurality of sub-shapelets of the one or more gestures to obtain a plurality of composite shapelets for the one or more gestures; and perform, a mapping of each of the plurality of composite shapelets with a plurality of trained shapelets stored in a system database to recognize the plurality of gestures comprised in the one or more activities being performed by the subject.

In accordance with an embodiment of the present disclosure, the one or more gesture windows are identified by eliminating a portion of the plurality of obtained time domain signals with no motion.

In accordance with an embodiment of the present disclosure, the spectrogram of the one or more gestures is obtained by transforming the plurality of obtained time domain signals into time-frequency domain using a short time Fourier transform (STFT) technique.

In accordance with an embodiment of the present disclosure, the one or more shapelets of the one or more gestures are characterized by a set of features obtained from a spectrogram contour of the one or more gestures.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
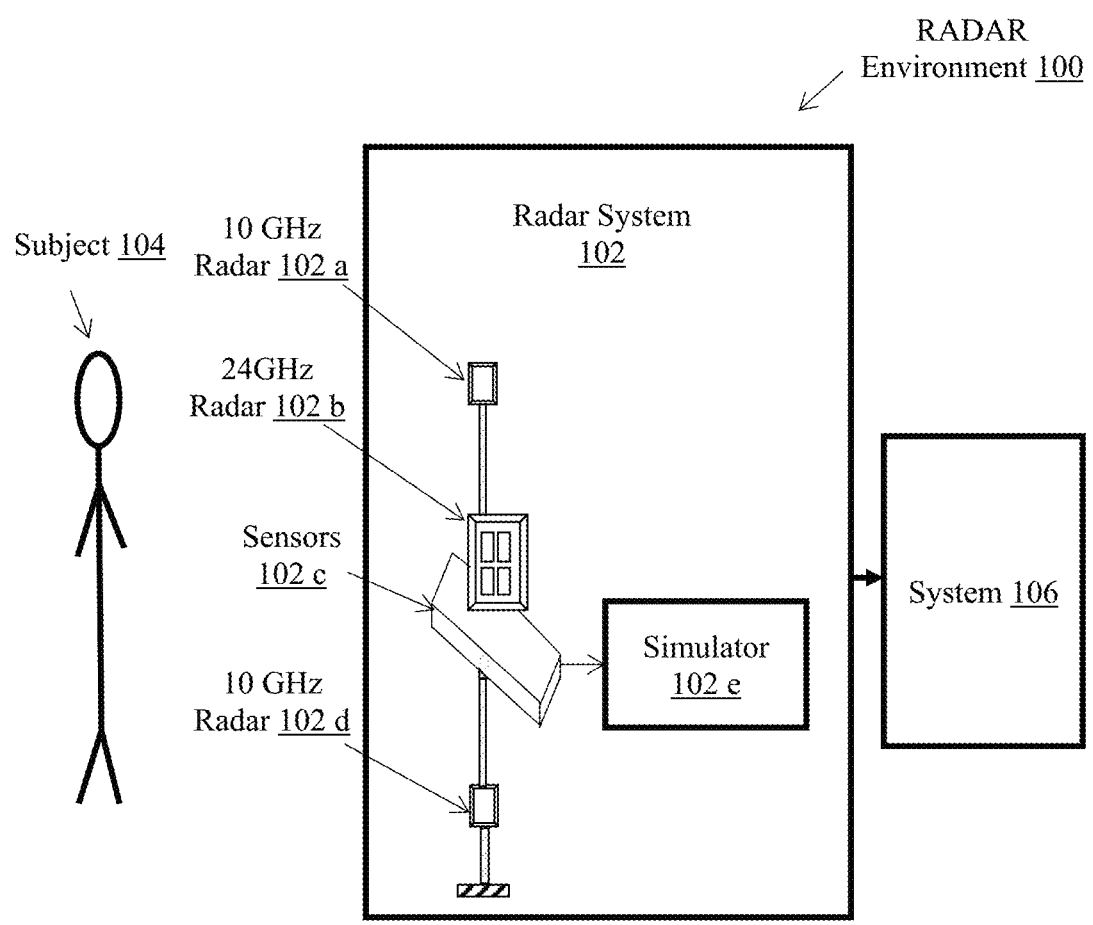
FIG. 1 illustrates an exemplary Radio Detection and Ranging (RADAR) environment with a system for shapelet decomposition based gesture recognition using radar, in accordance with an embodiment of present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Considering the significance of activity monitoring in many applications that include gait recognition, fall motion detection for elderly care technologies, radars have been gaining traction as a means to recognize gestures. Radars are unaffected by ambient light conditions and provide good performance while preserving privacy. Due to unobtrusive nature of radar-based approaches, they can be implemented for monitoring of infants, elderly people, patients and even for animal care.

State-of-the-art methods citing radar based gesture recognition use a single radar to capture the entire human body. A simple and cost-effective solution was provided by the Applicant in Indian Patent Application No. 201921012645 titled 'Systems and Methods for Three-Dimensional (3d) Reconstruction of Human Gestures from Radar Based Measurements', wherein a dual radar setup referred as a configurable panel radar system and a human style identification and gesture recognition of humans using machine learning classification was disclosed. The configurable panel radar system employs two vertically placed radars (a top radar and a bottom radar) for individually capturing movements of upper and lower parts of the human body to find micro-Doppler signatures. The micro-Doppler signatures are further used for different gestures and human style identification using standard machine learning classification techniques.

However, for a non-rigid subject like a human sitting/standing in front of the configurable panel radar system, capturing movements of whole body is a requisite for accurately recognize different gestures. Further, gesture recognition and human style identification using standard machine learning classification techniques suffer with problem of low classification accuracy and are highly dependent on collected data.

The present disclosure has addressed these issues by providing systems and methods for shapelet decomposition based gesture decomposition using radar. Although the technical problem was realized by the Applicant after providing the disclosure of Application no. 201821038470, it may be understood by a person skilled in the art, that the present disclosure may be applicable to use of the radar system for shapelets extraction and decomposition of extracted shapelets for accurate gesture recognition, in general, and is not limited to use of the standard machine learning classification techniques of Application no. 201821038470. In the context of the present disclosure, the expression 'radar system' refers to a setup of three vertically arranged radars, one or more sensors and a simulator placed in proximity to a subject of interest. In the present disclosure, shapelets are extracted from time domain radar signals obtained using the radar system and further decomposed to obtain superimposed shapelets addressing the issues of inaccurate gesture recognition due to difference in displacement and speed of same gestures when performed by different persons. In context of the present disclosure, the expression 'shapelet' is defined as a shape in an image (2-dimensional data) formed from micro-Doppler signatures visible in a time-frequency plot.

Referring now to the drawings, and more particularly to FIGS. 1 through 7F, where similar reference characters denote corresponding features consistently throughout the figures, there are shown preferred embodiments and these embodiments are described in the context of the following exemplary system and/or method.

FIG. 1 illustrates an exemplary Radio Detection and Ranging (RADAR) environment with a system for shapelet decomposition based gesture recognition, in accordance with an embodiment of present disclosure. The RADAR environment 100, utilizes a radar system 102 placed at proximity to a subject 104, whose activities are to be monitored. In the context of the present disclosure, the expression 'subject' refers to a living being such as a human or an animal or a bird. The radar system 102, is placed in proximity of the subject 104 but on a separate platform could be away from the subject 104, thus effectively away from any extreme environment of the subject 104 and still in capacity to transmit RADAR signal and accurately pick up a plurality of time domain signals reflected from the subject 104.

By referring to FIG. 1, it may be noted that the radar system 100 (with an information of motion doppler frequency) comprises a panel radar, one or more sensors and a simulator. In an embodiment, the panel radar is a configurable radar, and may comprise of a plurality of radars (with number of radars depending upon various requirements, for example, cost and accuracy, and the like) at different locations arranged vertically in proximity to the subject 104. Depending upon certain parameters such as the distance of the subject from the radars, average height deviation of subjects of interest, and the like, the location of the radar system 102 may be selected via the panel radar. In accordance with an embodiment of the present disclosure, it may be noted that the panel radar comprises of three radars vertically placed at a distance from each other, such that, top and bottom radars are used for segregating limb movements of the subject 104 and middle radar (Hereafter referred as reference radar throughout the description) is used for finer gesture detection. In an embodiment, the one or more sensors may include but not limited to a Kinect sensor which are placed in parallel to the reference radar. Data obtained by the one or more sensors is fed to the simulator to provide simulated data. In an embodiment, the step of simulating includes modelling of trajectory of different joints for gestures performed by the subject based upon the data obtained by the one or more sensors. Further, the simulator facilitates a modelling of joints and segments between the joints of the subject as ellipsoids. In another embodiment, the simulator converts the data provided by the one or more sensors into radar returns using a radar physics based mathematical framework and may also meaningfully expand datasets, keeping in mind physical constraints.

In an embodiment, the radar system 102 is configured to transmit and obtain a plurality of time domain signals reflected from the subject 104 whose activities are to be monitored. In an example embodiment of the present disclosure, the top and bottom radars are single channel radars operating at 10 GHz frequency and the reference radar is a quadrature phase (IQ) continuous wave (CW) radar operating at 24 GHz frequency. The plurality of obtained time domain signals reflected by the subject 104 are further used to generate a plurality of Micro Doppler signatures. The system 106 is configured to process and analyze the plurality of generated Micro Doppler signatures and monitor activities performed by the subject. The micro Doppler signature, as defined in the art refers to micro Doppler frequencies which exhibit Doppler modulation on top of a constant Doppler frequency. In case of human motion, the constant Doppler frequency is caused by motion of torso and micro Doppler frequencies are cause due to motion of body parts such as limbs, on top of the motion of the torso.

Figure 2:
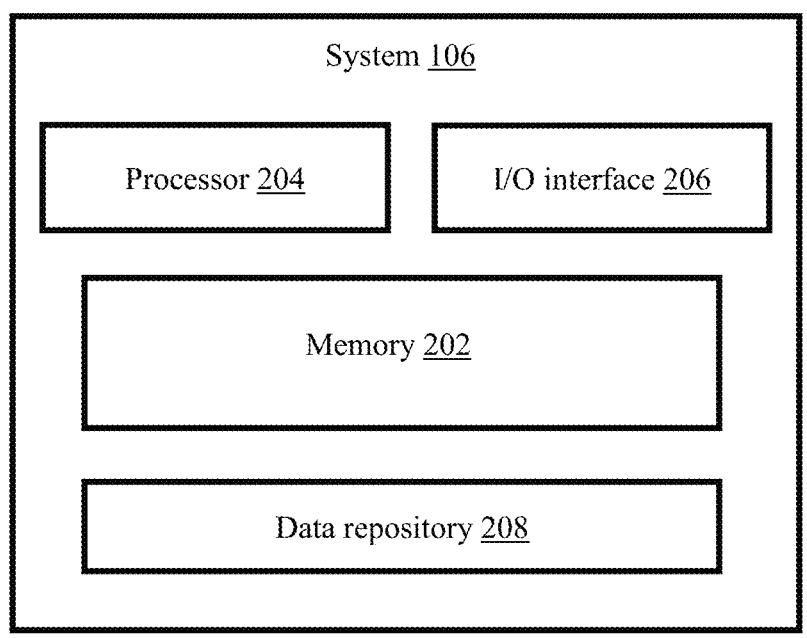
FIG. 2 illustrates an exemplary block diagram of the system of FIG. 1 for shapelet decomposition based gesture recognition using radar, in accordance with some embodiments of the present disclosure.

FIG. 2 illustrates an exemplary block diagram of the system 106 of FIG. 1 for shapelet decomposition based gesture recognition using radar, in accordance with some embodiments of the present disclosure. In an embodiment, the system 106 includes one or more processors 204, communication interface device(s) or input/output (I/O) interface(s) 206, and one or more data storage devices or memory 202 operatively coupled to the one or more processors 204. The one or more processors 204 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 106 can be implemented in a variety of computing systems, such as laptop computers, notebooks, hand-held devices, workstations, mainframe computers, servers, a network cloud and the like.

I/O interface(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 106 can be stored in the memory 202. The one or more modules (not shown) of the system 106 stored in the memory 202 may include routines, programs, objects, components, data structures, and so on, which perform particular tasks or implement particular (abstract) data types. In an embodiment, the memory 202 includes a data repository 208 for storing data processed, received, and generated as output(s) by the system 106.

The data repository 208, amongst other things, includes a system database and other data. In an embodiment, the data repository 208 may be external to the system 106 and accessed through the I/O interfaces 206. The memory 202 may further comprise information pertaining to input(s)/output(s) of each step performed by the processor 204 of the system 106 and methods of the present disclosure. In an embodiment, the system database stores information being processed at each step of the proposed methodology. In an embodiment, the memory 202 can be configured to store any data that is associated with the receiving of the plurality of time domain signals reflected by the subject 104, dictionary of basic shapelets and the like are stored in the memory 202. Further, all information (inputs, outputs and so on) pertaining to shapelet decomposition based gesture recognition including a plurality of trained gestures and their corresponding shapelets may be stored in the system database, as history data, for reference purpose. The other data may include, data generated as a result of the execution of the one or more modules (not shown) of the system 106 stored in the memory 202. The generated data may be further learnt to provide improved learning in the next iterations to output desired results with improved accuracy.

Figure 3:
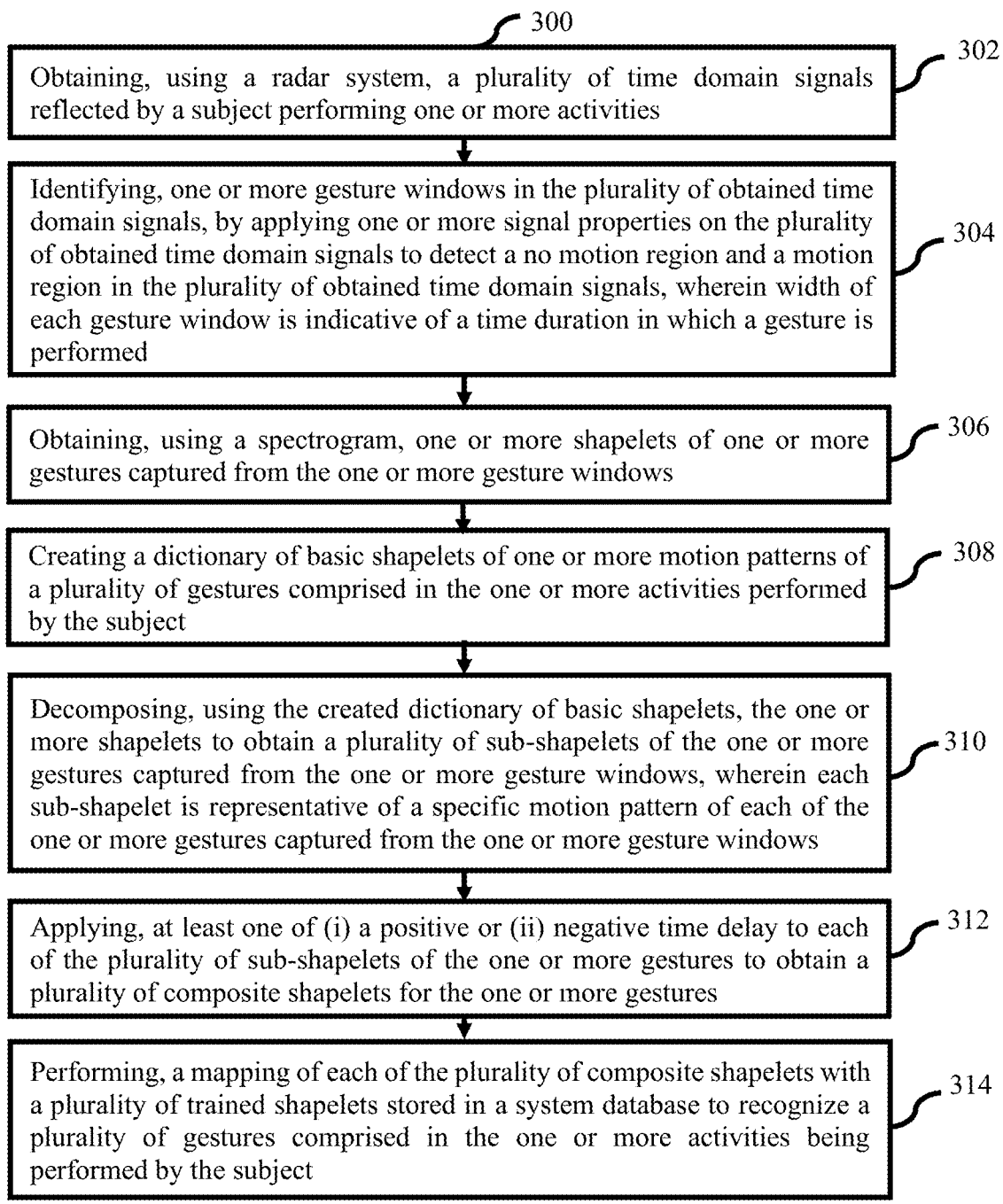
FIG. 3 illustrates an exemplary flow diagram of a processor implemented method for shapelet decomposition based gesture recognition using radar, in accordance with some embodiments of the present disclosure.

FIG. 3 illustrate an exemplary flow diagram of a processor implemented method 300 for shapelet decomposition based gesture recognition using radar, in accordance with some embodiments of the present disclosure. In an embodiment, the system 106 includes one or more data storage devices or memory 202 operatively coupled to the one or more processors 204 and is configured to store instructions configured for execution of steps of the method 300 by the one or more processors 204. The steps of the method 300 will now be explained in detail with reference to the exemplary RADAR environment 100 of FIG. 1 and the components of the system 106 of FIG. 2. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with an embodiment of the present disclosure, the one or more processors 204 are configured to obtain, at step 302, using the radar system 102, a plurality of time domain signals reflected by the subject 104 performing one or more activities. In an embodiment, if the subject is a human being, one or more activities may include but not limited to one or more physical exercises involving limb movements such as push-ups, running and the like, and one or more actions such as swinging, making a phone call, eating food, wearing a shirt, and the like. In an embodiment, if the subject is an animal or bird, then the one or more activities may include but not limited to climbing a tree (e.g., by Monkey), flapping wings (by birds or insects), and the like. In an embodiment, each radar of the radar system 102 provides a time domain signal reflected by the subject. In an embodiment, a base band signal equation for a quadrature CW radar used for calculating the plurality of time domain signals (also referred as Radar Return) obtained from each radar of the radar system 102 is provided in equation (1) shown below as:

$$\text{Radar return}(t) = \sum_{j=1}^{N} |rcs_j(t)| * \exp\left(\frac{-i4\pi d_j(t)}{\lambda}\right) \quad (1)$$

where, j refers to ellipsoid corresponding to joints of gestures in consideration, where j=1 ... N N denotes the total number of interconnected ellipsoids between the joints.

i is a complex number ($\sqrt{-1}$)

$rcs_j(t)$ indicates a radar cross section (RCS) of $j^{th}$ ellipsoid at time t.

$\lambda$ is transmitting wavelength of radar $d_j(t)$ refers to distance between centroid of the $j^{th}$ ellipsoid and radar position at time t.

$$\left(\frac{4\pi d_j(t)}{\lambda}\right)$$

denotes a phase shift due to distance $d_j(t)$ which gives Doppler frequency corresponding to each joint segment. When full body of the subject moves, the Doppler frequency of all joint segments collectively constitute micro-Doppler frequencies.

Figure 4A:
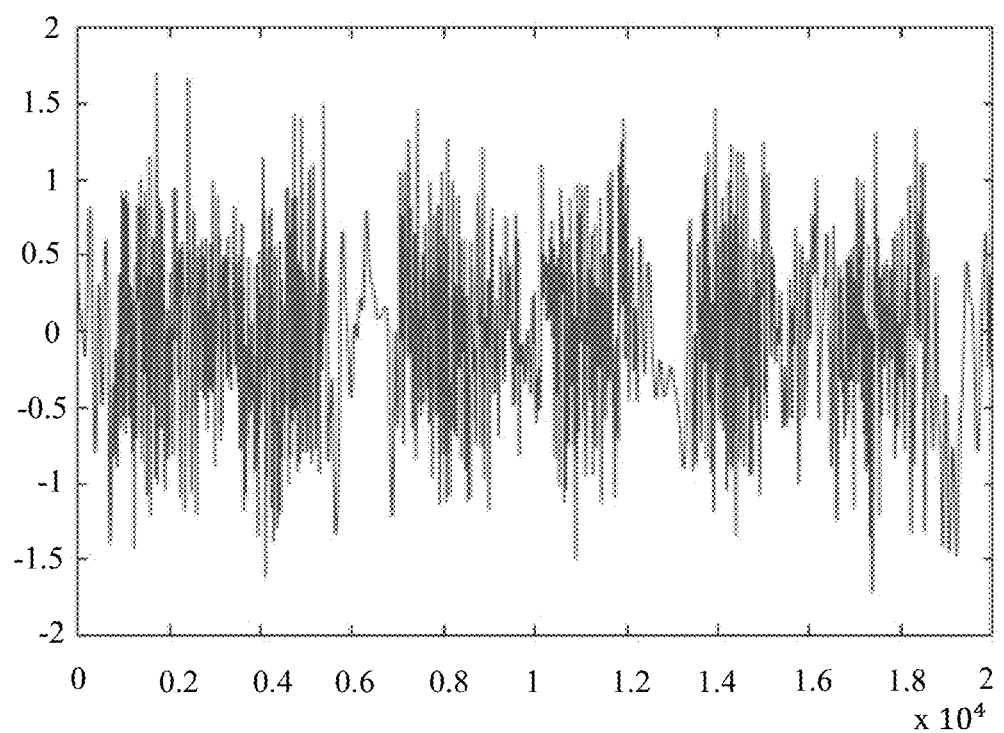
FIGS. 4A through 4E illustrate an example of gesture window identification, in accordance with some embodiments of the present disclosure.
Figure 4B:
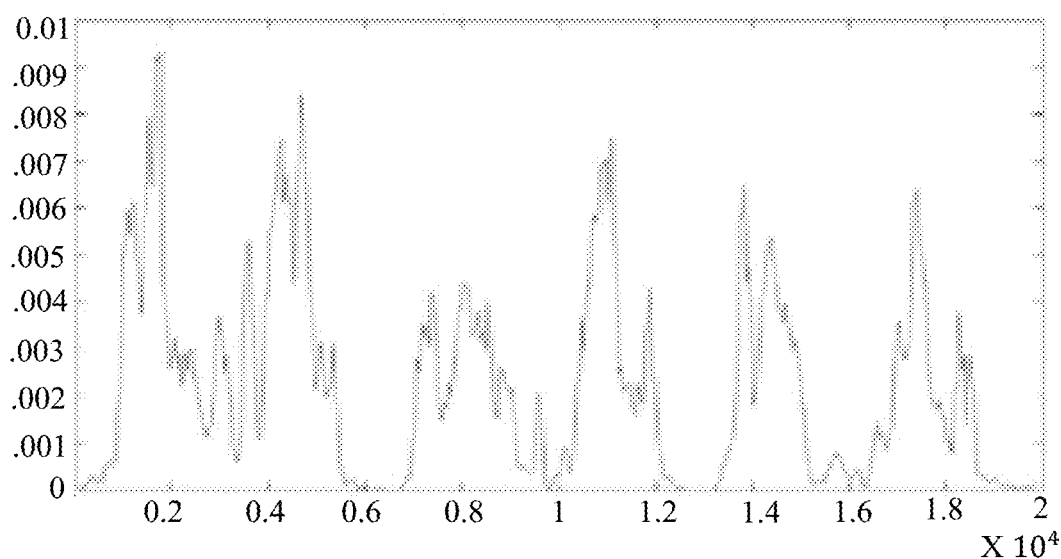

In accordance with an embodiment of the present disclosure, the one or more processors 204 are configured to identify, at step 304, one or more gesture windows in the plurality of obtained time domain signals, by applying one or more signal properties on the plurality of obtained time domain signals to detect a no motion region and a motion region in the plurality of obtained time domain signals, wherein width of each gesture window is indicative of a time duration in which a gesture is performed. In an embodiment, the one or more signal properties that are applied on obtained time domain signals may include but not limited to calculating average energy for the obtained time domain signals using equation (2) provided below as:

$$E_i = \sum_{k=1}^{n} |(S_k)|^2$$

where, $E_i$ refers to energy of time domain signal samples taken into consideration, n refers to number of time domain signal samples, and $S_k$ refers to amplitude of $k^{th}$ time domain signal sample, where k varies from 1 to n. FIGS. 4A through 4E illustrate an example of gesture window identification, in accordance with some embodiments of the present disclosure. FIG. 4A represents an example of the obtained time domain signal reflected by the subject 104 performing the one or more activities. FIG. 4B illustrates the step of determining average energy of the time domain signal of FIG. 4A. It can be seen from FIG. 4B, wherever, the average energy is minimum, it is considered either starting or ending of a gesture. Hence, a gesture window is considered from one energy dip to another. Thus, a region where the average energy is minimum is identified as a no motion region and no activity is detected to be performed in this region. In an embodiment, the one or more gesture windows are identified by eliminating a portion of the plurality of obtained time domain signals with no motion. For example, if a person performs an exercise for 5 seconds and stops for one second and further repeats the same exercise for another 5 seconds. In that case, the motion region is detected for initial and subsequent 5 seconds. These time durations of 5 seconds indicate that a gesture is performed and thus identified as gesture windows. However, the time duration of one second when the person stops before repeating the exercise is (or may be) identified as no motion region which is eliminated.

In an embodiment, prior to identifying one or more gesture windows, the plurality of obtained time domain signals are preprocessed for noise removal and in-phase quadrature phase (IQ) imbalance removal.

Figure 4C:
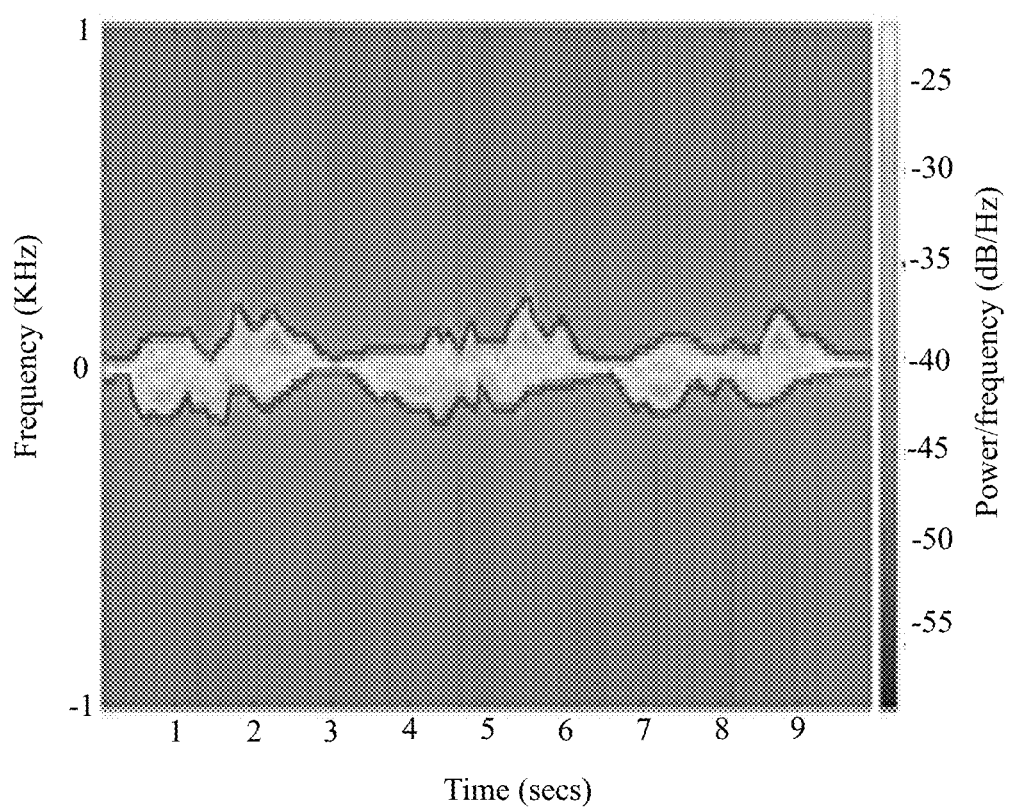
Figure 4D:
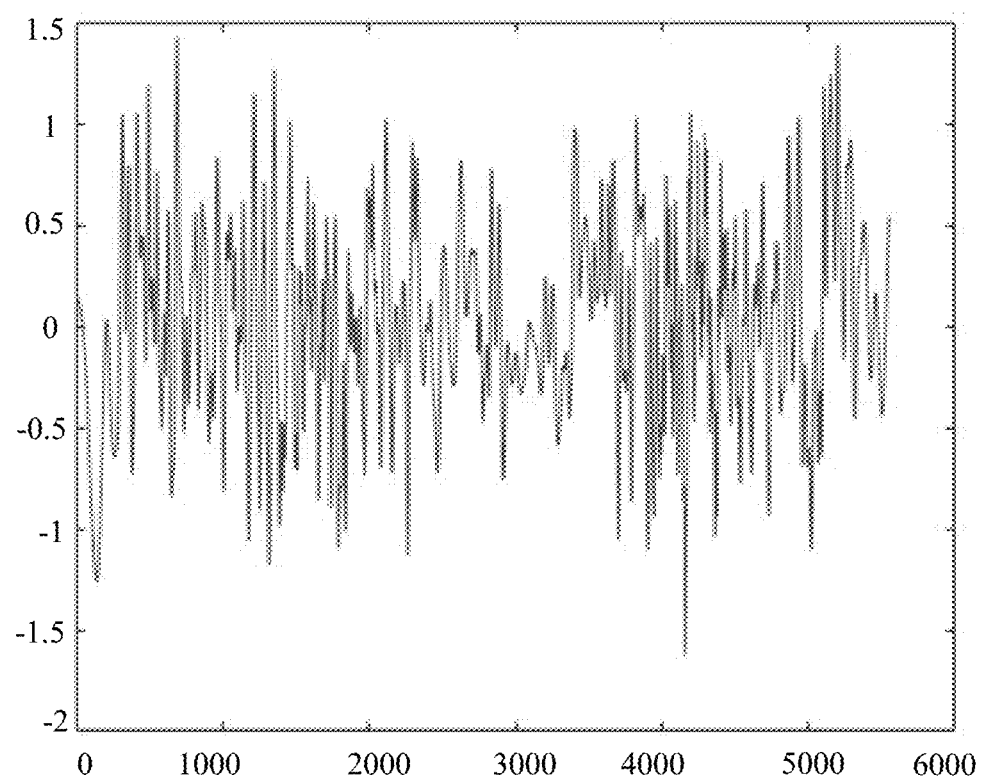
Figure 4E:
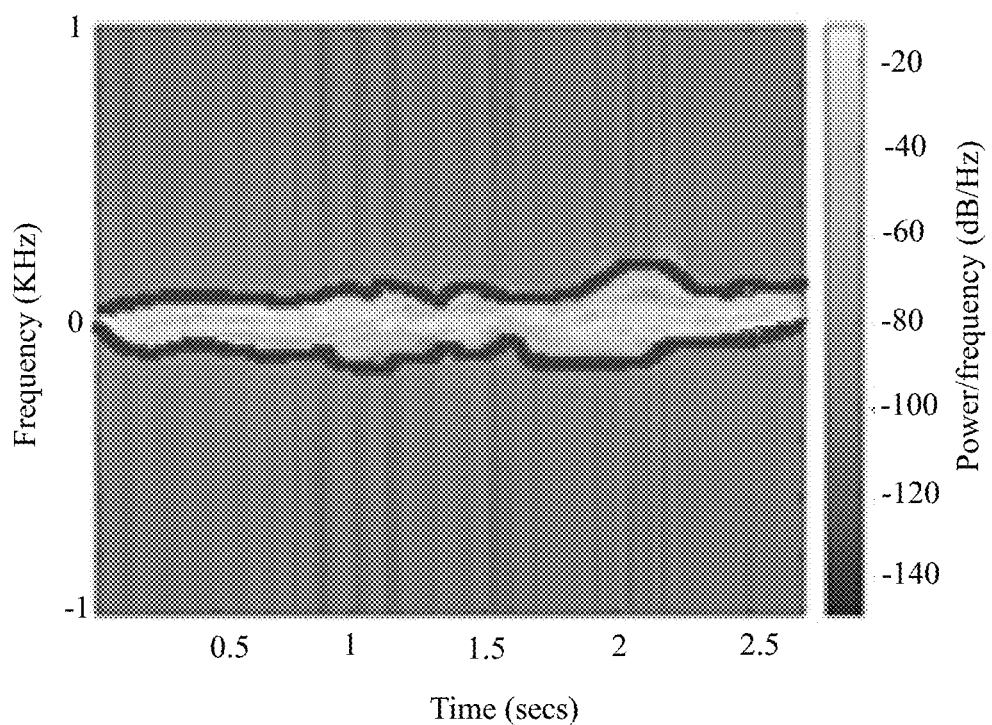

In accordance with an embodiment of the present disclosure, the one or more processors 204 are configured to obtain, at step 306, using a spectrogram, one or more shapelets of one or more gestures captured from the one or more gesture windows. Once indices of gesture windows are obtained, these can be used to slice the obtained time domain signal into multiple gesture windows and a corresponding spectrogram can be used for further analysis as shown in FIGS. 4C through 4E. In an embodiment, the spectrograms of the one or more gestures are obtained by transforming the plurality of obtained time domain signals into time-frequency domain using a short time Fourier transform (STFT) technique. Thus, the spectrogram can also be referred as time frequency plot of the plurality of obtained time domain signals. In an embodiment, the STFT technique is a standard technique to find time-frequency domain signals which is used to analyze how frequency content of a non-stationary signal changes over time. The STFT technique divides a full time series into shorter duration windows and computes Fourier Transform on these windows.

Figure 5A:
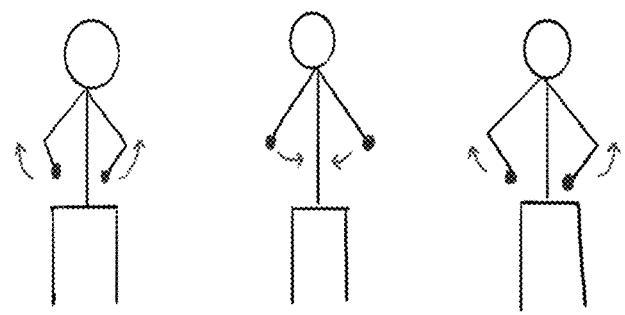
FIGS. 5A through 5C illustrate examples of complex gestures and corresponding basis gestures derived from the complex gestures, in accordance with some embodiments of the present disclosure.
Figure 5B:
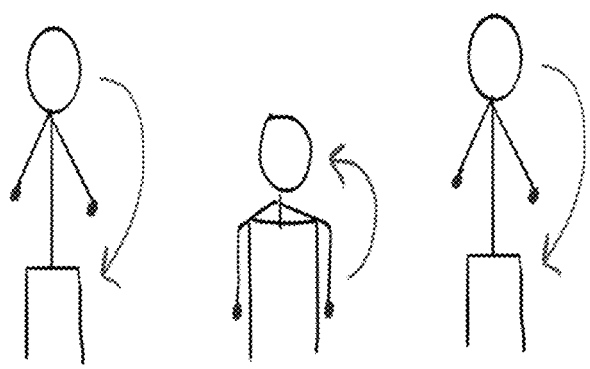
Figure 5C:
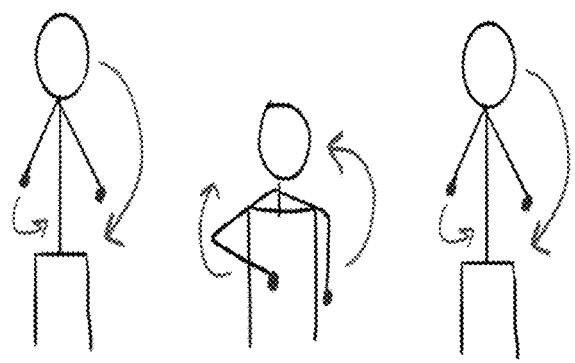

In accordance with an embodiment of the present disclosure, the one or more processors 204 are configured to create, at step 308, a dictionary of basic shapelets of one or more motion patterns of a plurality of gestures comprised in the one or more activities performed by the subject. It is observed, each of the plurality of time domain signals obtained as radar returns is additive. Thus, any gesture is an additive combination of radar returns due to different motion patterns (alternatively referred as limb movements). This can lead to a knowledge based decomposition of a gesture. Then that knowledge can be used on real data as source separation to decompose a real gesture in terms of basis gestures. In context of the present invention, the expression 'basis gestures' is defined as a set of gestures which form a part of a bigger complex gesture. FIGS. 5A through 5C illustrate examples of complex gestures and corresponding basis gestures derived from the complex gestures, in accordance with some embodiments of the present disclosure. As can be seen in FIG. 5A, a gesture 1 comprising three basis gestures is shown, wherein basis gesture 1 depicts putting hands outwards, basis gesture 2 depicts putting hands inwards, basis gesture 3 depicts putting hands outwards as in basis gesture 1. Similarly, FIG. 5B illustrates a gesture 2 comprising three basis gestures, wherein basis gesture 1 depicts a static position, basis gesture 2 depicts bending torso forwards with hands dangling, basis gesture 3 depicts Standing straight to gain basis gesture 1. Further, FIG. 5C illustrates a bow gesture comprising three basis gestures, wherein basis gesture 1 depicts a static position, basis gesture 2 depicts putting hands inwards and bending torso forward to make the bow gesture, basis gesture 3 depicts putting hands outwards and standing straight to gain basis gesture 1. This in turn enables creating a set of basis shapelets as it is observed that the bow gesture of FIG. 5C consists of basis shapelets from FIGS. 5A and 5B. For example, if G denotes a gesture comprised in activity performed by the subject. Then, dictionary of basic shapelets is created as $f(G)=\{d_1, d_2, d_3, \ldots d_n\}$, where $d_n$ denotes dictionary element for different motion patterns of a series of gestures comprised in the one or more activities performed by the subject. This is done in the Time—Frequency Domain. Using this dictionary of basis shapelets (also referred as knowledge based dictionary), any gesture can be created as a linear combination of the elements of this dictionary f(G).

In accordance with an embodiment of the present disclosure, at step 310, the one or more processors 204 are configured to decompose, using the created dictionary of basic shapelets, the one or more shapelets to obtain a plurality of sub-shapelets of the one or more gestures captured from the one or more gesture windows, wherein each sub-shapelet is representative of a specific motion pattern of each of the one or more gestures captured from the one or more gesture windows. In another embodiment, a decomposition method D(G) is used that decomposes the one or more shapelets of gestures of radar return. As radar return is additive sum of multiple motion patterns (alternatively referred as limb movements), sub-shapelets are represented by a decomposed spectrogram of the spectrogram of a gesture. It is observed that many subjects may perform same gesture at different speeds in terms of displacement of limbs and time taken to perform same gesture. Consequently, minor difference in shapelets may arise, although the basic shapelet of a gesture for different subjects is same. To resolve this problem, the shapelet of one or more gestures of a complex activity are decomposed into sub-shapelets of hand and leg movements.

In accordance with an embodiment of the present disclosure, at step 312, the one or more processors 204 are configured to apply, at least one of (i) a positive or (ii) negative time delay to each of the plurality of sub-shapelets of the one or more gestures to obtain a plurality of composite shapelets for the one or more gestures. Problem of occurrence of minor differences in shapelets is resolved by first decomposing the shapelet of the one or more gestures of a complex activity being performed by the subject and then applying either a positive or negative time delay to each of the plurality of sub-shapelets of the one or more gestures. For example, if a shapelet is decomposed into sub-shapelets $S_1$, $S_2$, and $S_3$, then a time delay $\tau$ is provided to each of $S_1$, $S_2$, and $S_3$. Here, $\tau$ may be positive or negative. Using these positive and negative time delayed sub-shapelets, corresponding composite shapelet(s) is/are obtained by using superimposition of the positive and negative time delayed sub-shapelets. For example if a gesture comprises a hand movement 1, a leg movement and a hand movement 2, then each of the hand movement 1, the leg movement and the hand movement 2 are represented by sub-shapelets and a positive or negative time delay is provided to each of them based on their displacement and time pattern (e.g., negative time delay for fast displacement and positive time delay for slow displacement) which are further combined based on superimposition to provide a composite shapelet of the gesture.

Figure 6A:
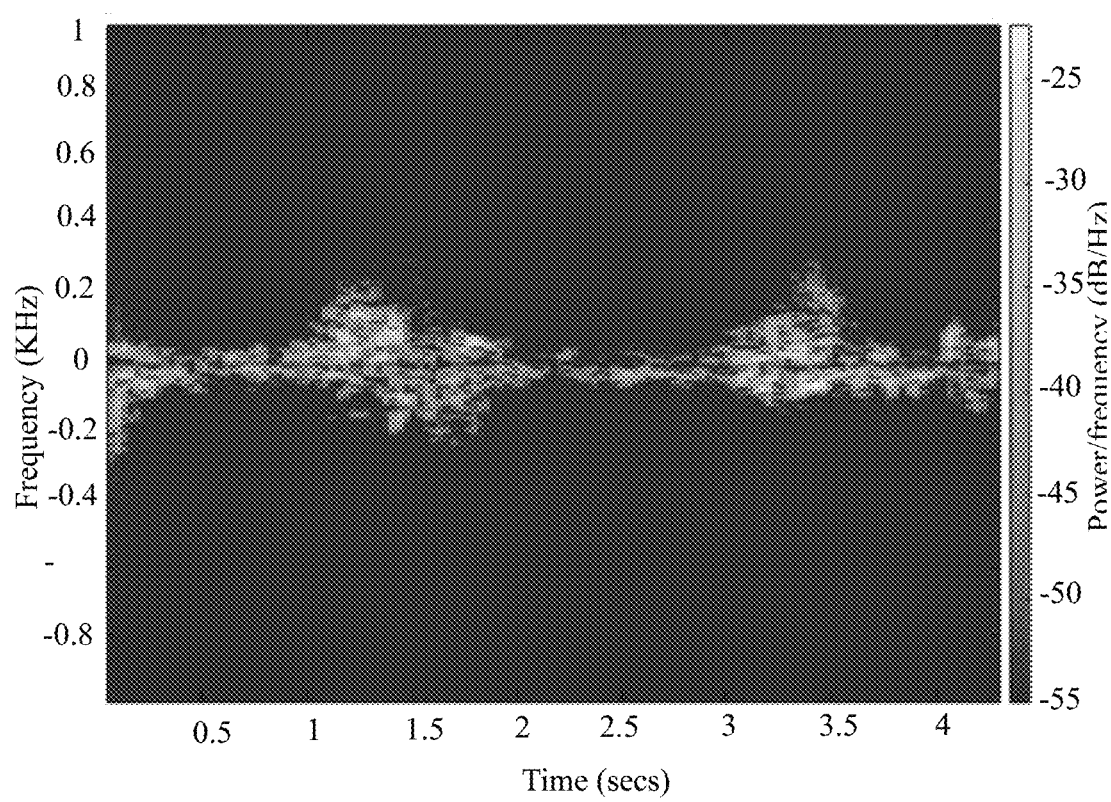
FIGS. 6A and 6B illustrate an example of characterizing shapelets using spectrogram contour based feature extraction, in accordance with some embodiments of the present disclosure.
Figure 6B:
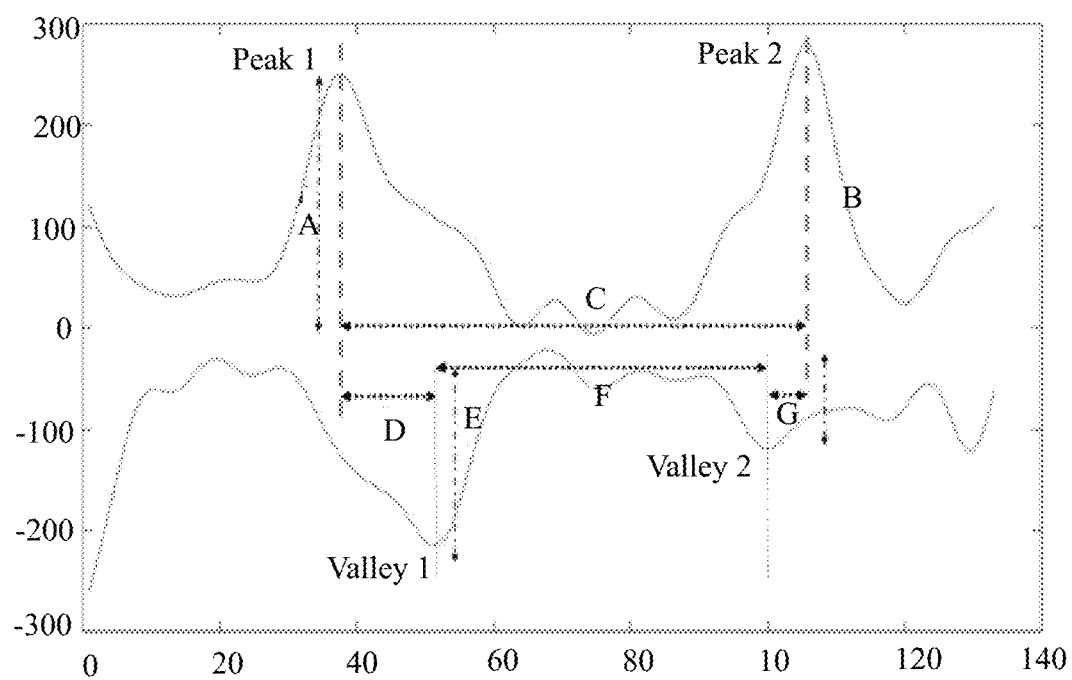

In accordance with an embodiment of the present disclosure, at step 314, the one or more processors 204 are configured to perform, a mapping of each of the plurality of composite shapelets with a plurality of trained shapelets stored in a system database to recognize the plurality of gestures comprised in the one or more activities being performed by the subject. In an embodiment, each composite shapelet obtained corresponding to a gesture shows variations for each user as well as inter user variation for a single gesture. Also inter gesture and intra gesture variations are observed. Such properties of the composite shapelets are captured to form a set of features for each gesture. In an embodiment, the one or more shapelets of the one or more gestures are characterized by a set of features obtained from a spectrogram contour of the one or more gestures. In context of the present disclosure, expression 'spectrogram contour' is defined as a basic outer shape of the shapelets in the time-frequency domain. In an embodiment, the set of features to characterize a shapelet may include but not limited to amplitude of a first and a second peak, amplitude of a first and a second valley, peak to peak time difference, valley to valley time difference, first peak to first valley peak difference, Second valley to second peak difference. FIGS. 6A and 6B illustrate an example of characterizing shapelets using spectrogram contour based feature extraction, in accordance with some embodiments of the present disclosure. As can be seen in FIG. 6B, the spectrogram contour of a wearing shirt gesture is shown. Further, a list of some of distinguishing features for the shapelets for the wearing shirt gesture including A, B, C, D, E, F and G is provided. Here, A denotes amplitude of peak 1, B denotes amplitude of peak 2, C denotes peak to peak time difference, D denotes first peak to first valley peak difference, E denotes amplitude of valley 1, F denotes valley to valley time difference, and G denotes second valley to second peak difference. Here, the amplitude of the peaks and valleys define maximum and minimum frequencies of the micro Doppler signatures respectively. This is important as it defines the speed at which limb moves. This is one of the reasons, why shapelets are distinct for different gestures.

In accordance with an embodiment of the present disclosure, each composite shapelet is further converted into a N-dimensional vector and different statistical properties are observed to perform mapping. The step of performing mapping helps in recognizing a new gesture performed by the subject. Further, the plurality of recognized gestures are used to intervene and take necessary action corresponding to those gestures. For example, an eating gesture indicates that the subject needs food for eating and an order is placed (or app is opened for ordering).

Experimental Observations

Figure 7A:
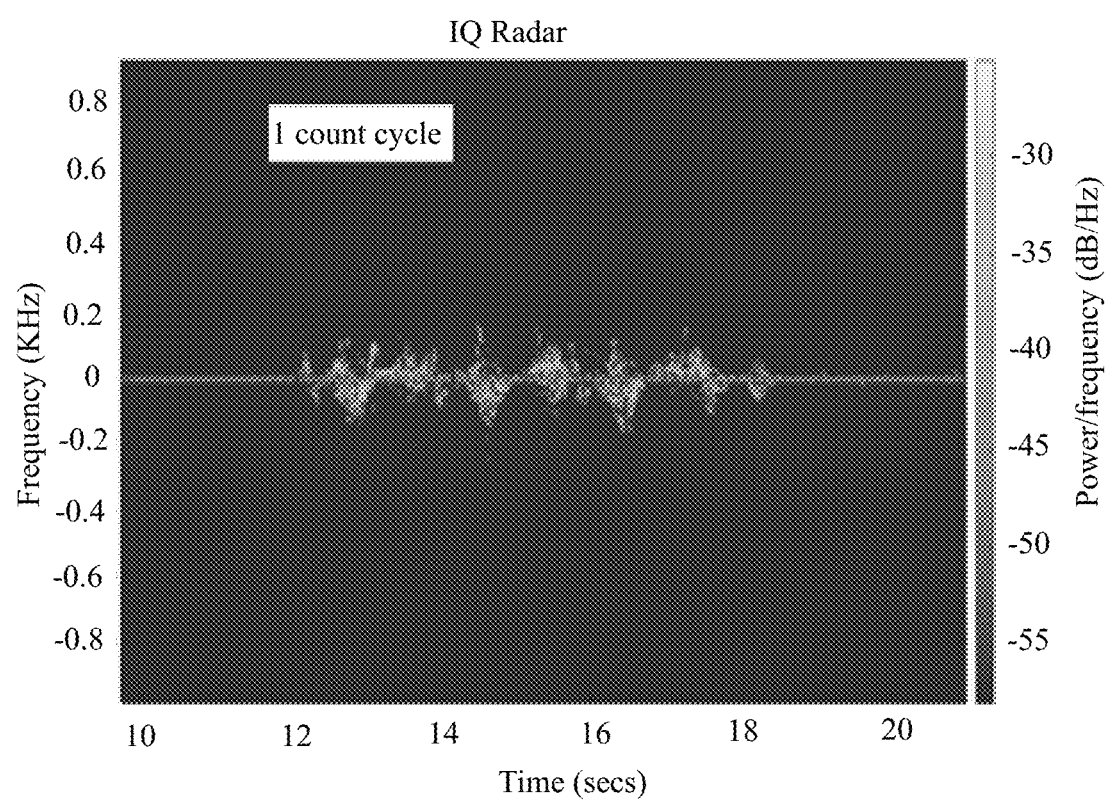
FIGS. 7A through 7F illustrate experimental results of shapelet decomposition based gesture recognition using radar by showing different spectrograms of different gestures, in accordance with some embodiments of the present disclosure.
Figure 7B:
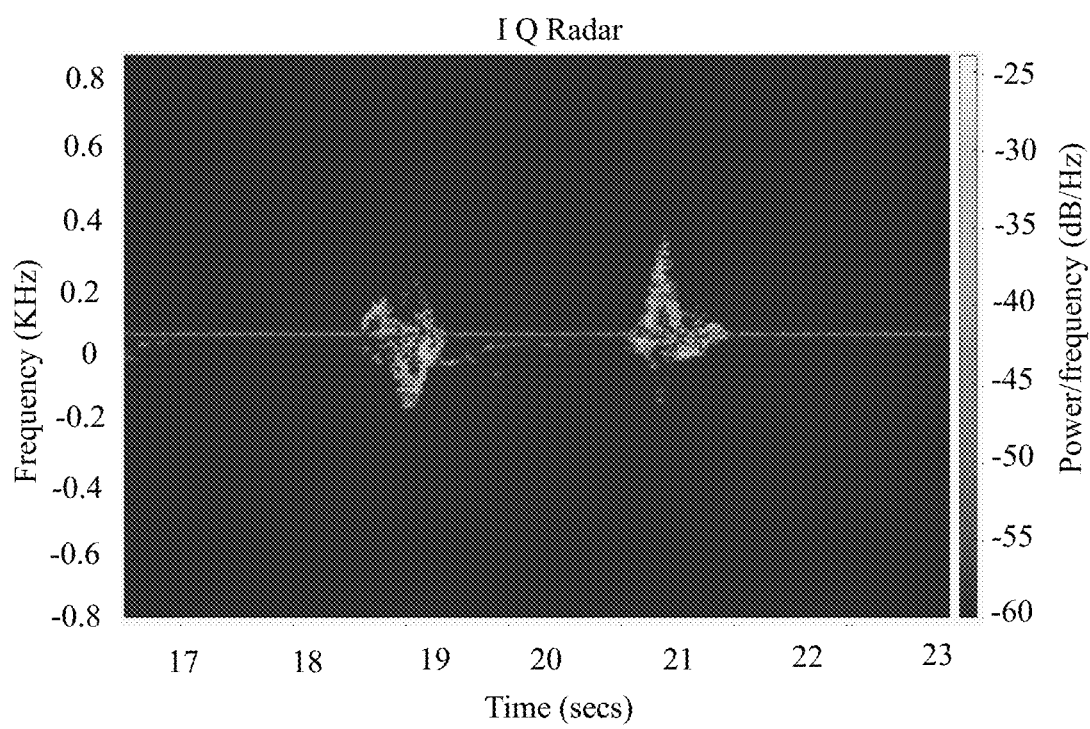
Figure 7C:
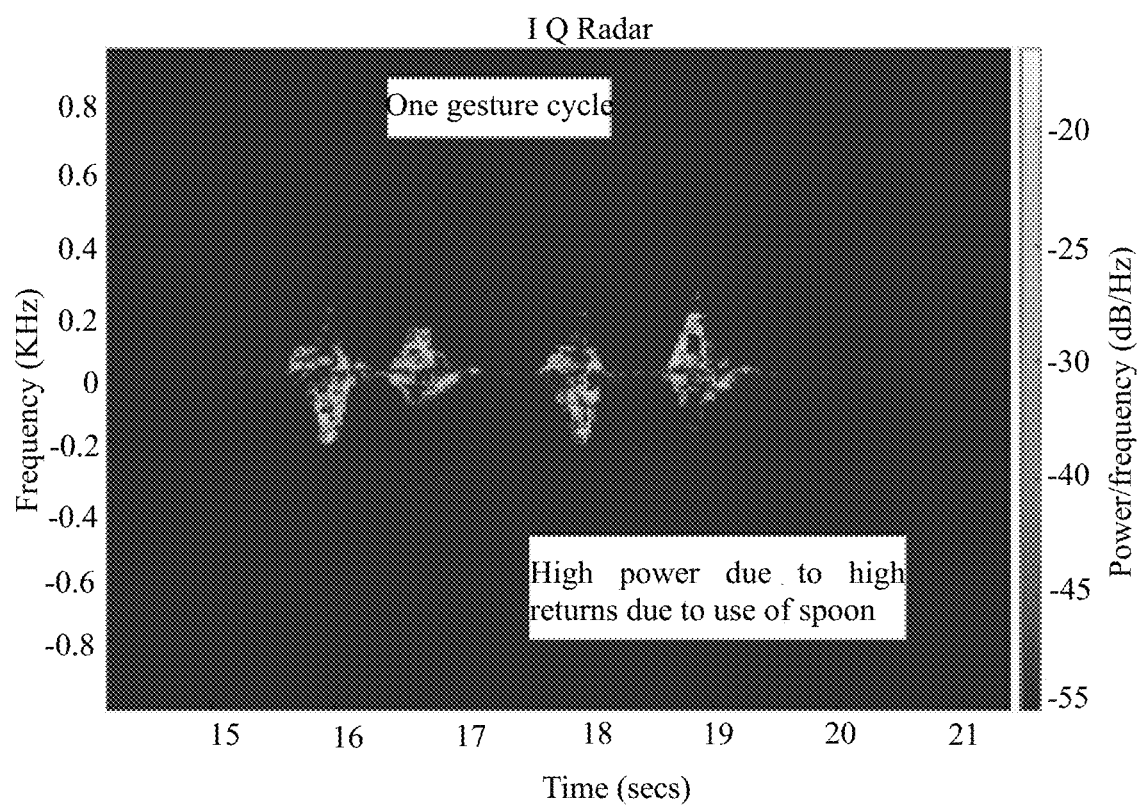
Figure 7D:
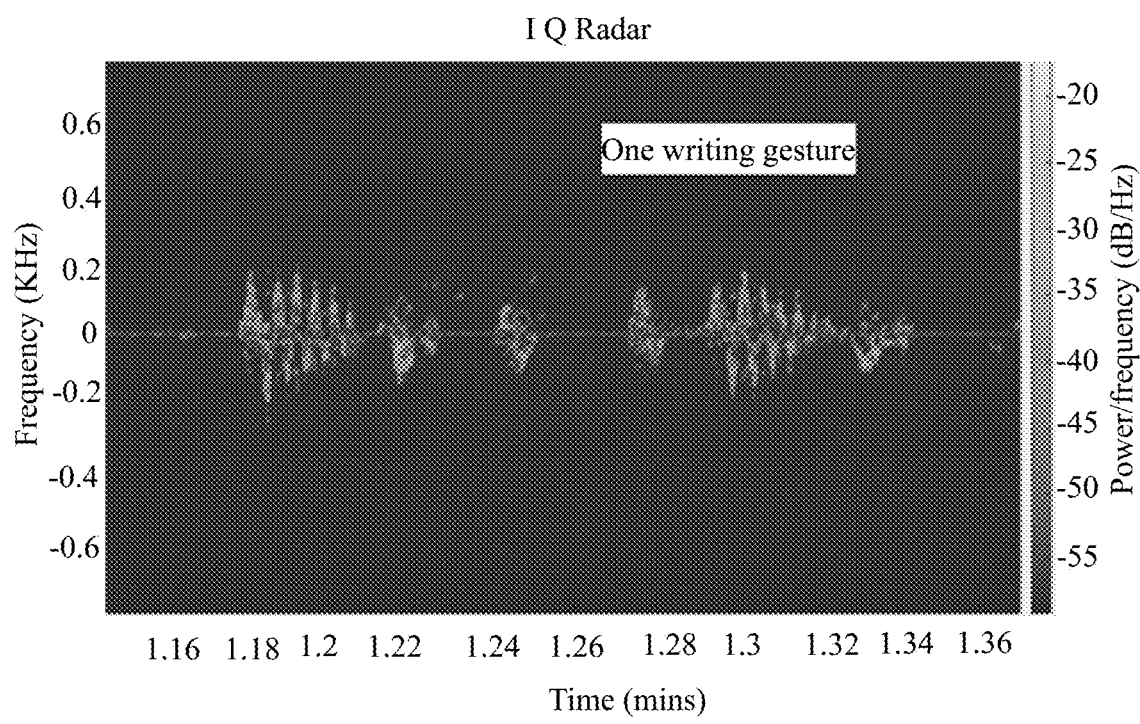
Figure 7E:
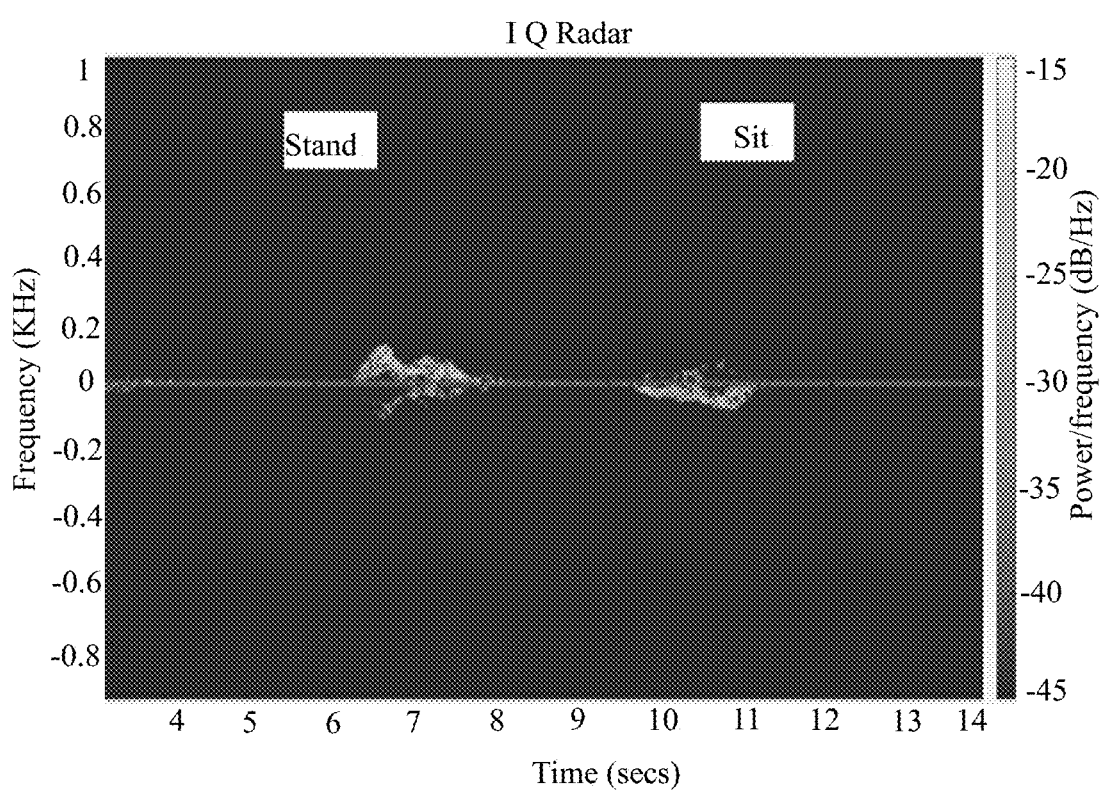
Figure 7F:
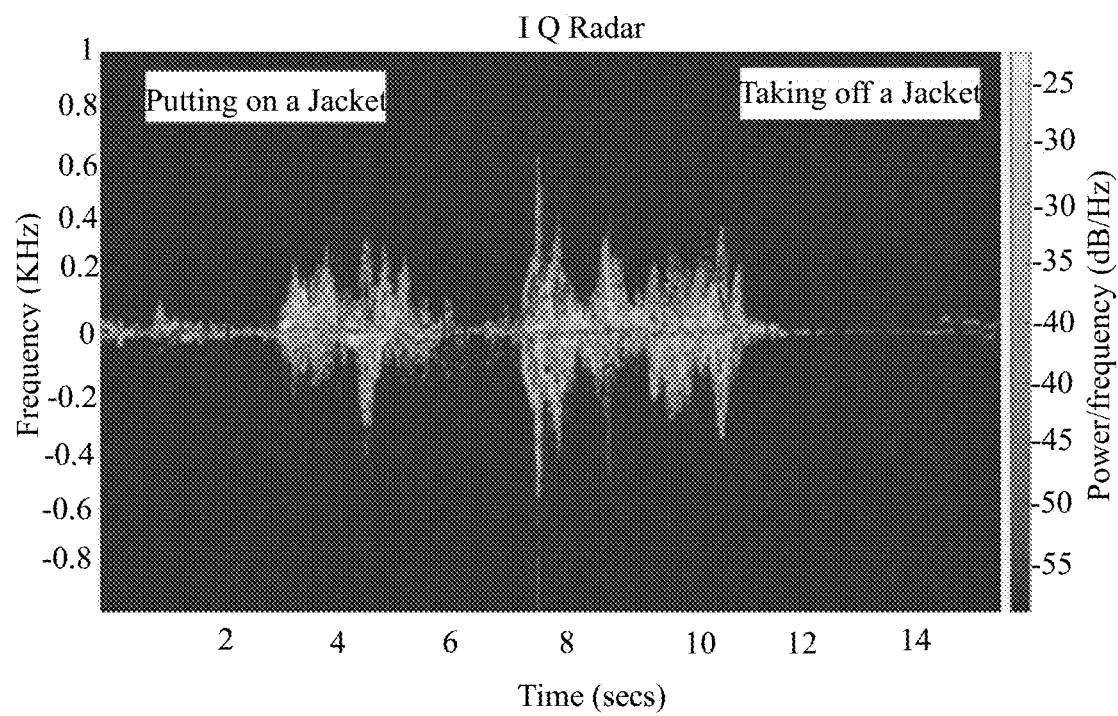

FIGS. 7A through 7F illustrate experimental results of shapelet decomposition based gesture recognition using radar by showing different spectrograms of different gestures, in accordance with some embodiments of the present disclosure. FIG. 7A illustrates spectrogram of gesture 1 which is counting things (or objects). Here, the subject has counted three objects/things. Hence, it can be seen in FIG. 7A that same shapelet is being repeated thrice. FIG. 7B through 7F illustrate spectrogram of gesture 2, gesture 3, gesture 4, gesture 5, and gesture 6 which are making a phone call, eating, writing, sit down-stand up, and putting on a jacket-taking it off respectively. As can be seen from FIGS. 7A through 7F, it is observed that shapelets are distinct for different gestures. In an embodiment, among a list of gestures, almost all of them have unique representation in time frequency domain. So, assuming all persons do a described gesture in same way, for a gesture, a common shapelet exists for all persons.

Conventional methods or systems of gesture recognition and/or are highly dependent on collected data. For example, results of conventional systems or methods obtained for American people might not be same for Indians due to change in body type and physique. Embodiments of the present disclosure resolve the unresolved problem of gesture recognition methods using a radar system, which provides first stage distinction on which limbs of body of a subject have been moved. Further, if a set of activities are provided to be performed by the subject, distinct shapelets are obtained by transforming the time domain signal of the radar returns to time frequency. The method and/or system of the present disclosure doesn't rely too much on any trained model based on collected data and thus is/are computationally efficient. Moreover, inter person gesture variations are covered due to decomposition into sub-shapelets and providing adequate delay to gain requisite spectrograms.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
   obtaining, using a radar system, a plurality of time domain signals reflected by a subject performing one or more activities, wherein the subject refers to a living being including a human or an animal or a bird;
   identifying one or more gesture windows in the plurality of obtained time domain signals, by applying one or more signal properties on the plurality of obtained time domain signals to detect a no motion region and a motion region in the plurality of obtained time domain signals, wherein width of each gesture window is indicative of a time duration in which a gesture is performed, wherein applying the one or more signal properties comprises determining an average energy for the plurality of obtained time domain signals to identify a region where the average energy is minimum as the no motion region;
   obtaining, using a spectrogram, one or more shapelets of one or more gestures captured from the one or more gesture windows;
   creating a dictionary of basic shapelets of one or more motion patterns of a plurality of gestures comprised in the one or more activities performed by the subject;
   decomposing, using the created dictionary of basic shapelets, the one or more shapelets to obtain a plurality of sub-shapelets of the one or more gestures captured from the one or more gesture windows, wherein each sub-shapelet is representative of a specific motion pattern of each of the one or more gestures captured from the one or more gesture windows;
   applying, at least one of (i) a positive or (ii) negative time delay to each of the plurality of sub-shapelets of the one or more gestures to obtain a plurality of composite shapelets for the one or more gestures, wherein the plurality of composite shapelets for the one or more gestures are obtained by superimposing the positive and the negative time delays of each of the plurality of sub-shapelets, and wherein the positive and the negative time delay is provided to each of the plurality of sub-shapelets based on a displacement and a time pattern of the one or more gestures; and
   performing, a mapping of each of the plurality of composite shapelets with a plurality of trained shapelets stored in a system database to recognize the plurality of gestures comprised in the one or more activities being performed by the subject, wherein each of the plurality of composite shapelet is converted into a 2-dimensional or 3-dimensional vector and mapping is performed to recognize a new gesture performed by the subject.

2. The processor implemented method of claim 1, wherein the one or more gesture windows are identified by eliminating a portion of the plurality of obtained time domain signals with no motion.

3. The processor implemented method of claim 1, wherein the spectrogram of the one or more gestures is obtained by transforming the plurality of obtained time domain signals into time-frequency domain using a short time Fourier transform (STFT) technique.

4. The processor implemented method of claim 1, wherein the one or more shapelets of the one or more gestures are characterized by a set of features obtained from a spectrogram contour of the one or more gestures.

5. A system, comprising: one or more data storage devices operatively coupled to one or more hardware processors and configured to store instructions configured for execution via the one or more hardware processors to:
   obtain, using a radar system, a plurality of time domain signals reflected by a subject performing one or more activities, wherein the subject refers to a living being including a human or an animal or a bird;
   identify, one or more gesture windows in the plurality of obtained time domain signals, by applying one or more signal properties on the plurality of obtained time domain signals to detect a no motion region and a motion region in the plurality of obtained time domain signals, wherein width of each gesture window is indicative of a time duration in which a gesture is performed, wherein applying the one or more signal properties comprises determining an average energy for the plurality of obtained time domain signals to identify a region where the average energy is minimum as the no motion region;
   obtain, using a spectrogram, one or more shapelets of one or more gestures captured from the one or more gesture windows;
   create a dictionary of basic shapelets of one or more motion patterns of a plurality of gestures comprised in the one or more activities performed by the subject;
   decompose, using the created dictionary of basic shapelets, the one or more shapelets to obtain a plurality of sub-shapelets of the one or more gestures captured from the one or more gesture windows, wherein each sub-shapelet is representative of a specific motion pattern of each of the one or more gestures captured from the one or more gesture windows;
   apply, at least one of (i) a positive or (ii) negative time delay to each of the plurality of sub-shapelets of the one or more gestures to obtain a plurality of composite shapelets for the one or more gestures, wherein the plurality of composite shapelets for the one or more gestures are obtained by superimposing the positive and the negative time delays of each of the plurality of sub-shapelets, and wherein the positive and the negative time delay is provided to each of the plurality of sub-shapelets based on a displacement and a time pattern of the one or more gestures; and
   perform, a mapping of each of the plurality of composite shapelets with a plurality of trained shapelets stored in a system database to recognize the plurality of gestures comprised in the one or more activities being performed by the subject, wherein each of the plurality of composite shapelet is converted into a 2-dimensional or 3-dimensional vector and mapping is performed to recognize a new gesture performed by the subject.

6. The system of claim 5, wherein the one or more gesture windows are identified by eliminating a portion of the plurality of obtained time domain signals with no motion.

7. The system of claim 5, wherein the spectrogram of the one or more gestures is obtained by transforming the plurality of obtained time domain signals into time-frequency domain using a short time Fourier transform (STFT) technique.

8. The system of claim 5, wherein the one or more shapelets of the one or more gestures are characterized by a set of features obtained from a spectrogram contour of the one or more gestures.

9. A computer program product comprising a non-transitory computer readable medium having a computer readable program embodied therein, wherein the computer readable program, when executed on a computing device, causes the computing device to:

obtain, using a radar system, a plurality of time domain signals reflected by a subject performing one or more activities, wherein the subject refers to a living being including a human or an animal or a bird;

identify, one or more gesture windows in the plurality of obtained time domain signals, by applying one or more signal properties on the plurality of obtained time domain signals to detect a no motion region and a motion region in the plurality of obtained time domain signals, wherein width of each gesture window is indicative of a time duration in which a gesture is performed, wherein applying the one or more signal properties comprises determining an average energy for the plurality of obtained time domain signals to identify a region where the average energy is minimum as the no motion region;

obtain, using a spectrogram, one or more shapelets of one or more gestures captured from the one or more gesture windows;

create a dictionary of basic shapelets of one or more motion patterns of a plurality of gestures comprised in the one or more activities performed by the subject;

decompose, using the created dictionary of basic shapelets, the one or more shapelets to obtain a plurality of sub-shapelets of the one or more gestures captured from the one or more gesture windows, wherein each sub-shapelet is representative of a specific motion pattern of each of the one or more gestures captured from the one or more gesture windows;

apply, at least one of (i) a positive or (ii) negative time delay to each of the plurality of sub-shapelets of the one or more gestures to obtain a plurality of composite shapelets for the one or more gestures, wherein the plurality of composite shapelets for the one or more gestures are obtained by superimposing positive and the negative time delays of each of the plurality of sub-shapelets, and wherein the positive and the negative time delay is provided to each of the plurality of sub-shapelets based on a displacement and a time pattern of the one or more gestures; and perform, a mapping of each of the plurality of composite shapelets with a plurality of trained shapelets stored in a system database to recognize the plurality of gestures comprised in the one or more activities being performed by the subject, wherein each of the plurality of composite shapelet is converted into a 2-dimensional or 3-dimensional vector and mapping is performed to recognize a new gesture performed by the subject.

10. The computer program product of claim 9, wherein the one or more gesture windows are identified by eliminating a portion of the plurality of obtained time domain signals with no motion.

11. The computer program product of claim 9, wherein the spectrogram of the one or more gestures is obtained by transforming the plurality of obtained time domain signals into time-frequency domain using a short time Fourier transform (STFT) technique.

12. The computer program product of claim 9, wherein the one or more shapelets of the one or more gestures are characterized by a set of features obtained from a spectrogram contour of the one or more gestures.

* * * * *